United States Patent [19]

Etcheparre et al.

[11] 4,370,932

[45] Feb. 1, 1983

[54] APPARATUS FOR THE INTERCONNECTION OF TWO MOBILE CARRIERS GUIDED BY PARALLEL RAILS

[75] Inventors: Jean Etcheparre; Bernard Etcheparre, both of Merignac, France

[73] Assignee: Lectra Systemes S.A., Pont de la Maye, France

[21] Appl. No.: 189,813

[22] Filed: Sep. 22, 1980

[30] Foreign Application Priority Data

Sep. 26, 1979 [FR] France ................. 79 24459

[51] Int. Cl.³ ............................................. B66C 13/18
[52] U.S. Cl. ...................... 105/163 SK; 104/173 R; 104/178; 212/215; 414/279
[58] Field of Search .............. 104/165, 172 R, 173 R, 104/178, 229, 235; 105/163 SK; 212/205, 207, 215; 414/276, 277, 279

[56] References Cited

U.S. PATENT DOCUMENTS

| | | | |
|---|---|---|---|
| 198,718 | 12/1877 | Weston | 212/215 |
| 687,633 | 11/1901 | Kammerer | 212/215 |
| 2,743,024 | 4/1956 | Schmitt | 212/214 |
| 4,273,147 | 1/1981 | Twitchell et al. | 104/172 R X |

FOREIGN PATENT DOCUMENTS

| | | |
|---|---|---|
| 116658 | 1/1900 | Fed. Rep. of Germany . |
| 853949 | 10/1952 | Fed. Rep. of Germany . |
| 1007485 | 2/1957 | Fed. Rep. of Germany . |

Primary Examiner—Randolph Reese
Attorney, Agent, or Firm—Sandler & Greenblum

[57] ABSTRACT

An apparatus is provided for the interconnection of two mobile carriages which are connected by a rigid beam and guided along parallel guide rails. The apparatus permits the simultaneous and identical movement, with respect to both direction and distance, of the carriages along the respective guide rails. The apparatus comprises two generally symmetrically disposed cables, each of which is attached at one end to an end of one rail and at its other end to a diagonally opposed end of a parallel rail. Intermediate the attachment points, the cables connect the carriages by resting on and being supported by return pulleys which are integral with the carriages. Each cable thereby describes a generally Z-shaped configuration. The Z-shaped configurations are symmetrically disposed in order to cause, during the displacement of one carriage, the tensioning of one of the cables, and thereby cause the other carriage to be identically and simultaneously displaced.

2 Claims, 2 Drawing Figures

APPARATUS FOR THE INTERCONNECTION OF TWO MOBILE CARRIERS GUIDED BY PARALLEL RAILS

BACKGROUND OF THE INVENTION

1. Field of the Invention

The present invention relates to an apparatus for the interconnection of two mobile carriages which are connected by a rigid beam, and guided by and along parallel rails, to permit simultaneous and identical movement, with respect to direction and distance, of the carriages along respective guide rails.

2. Discussion of the Prior Art

It is known that during the displacement of a rigid beam provided at its ends with carriages resting on guide rails which are arranged in parallel, by means utilized to cause displacement of the beam along a direction parallel to the guide rails, the beam does not maintain a perfect perpendicularity with respect to the rails. This is particularly true when the displacement is caused by an element acting on only one of the carriages, when movement of the beam can create a vibratory state during its displacement. On the other hand, if the beam is provided with movable elements displacing themselves perpendicularly with respect to the displacement of the beam, such as a tracing element or any other element, the position of the movable element or elements is imprecise.

SUMMARY OF THE INVENTION

The present invention has as an aim to overcome such previously encountered inconveniences.

The present interconnection apparatus for mobile carriages which are connected by a rigid beam, and which are guided by parallel rails positioned between them, allows for simultaneous and identical movement, with respect to both direction and distance, of the carriages along their respective rails. The apparatus comprises two tensioned symmetrical cables connecting the carriages to parallel guide rails, one end of each cable being attached to an end of one of the guide rails while the other end of each cable is attached to the opposite end of the other, parallel rail. The carriages are connected to the cables between the attachment points of the cables to the rails by supporting the cables on a fixed return pulley with which each of the carriages is provided or attached. In this fashion, each cable defines a Z-shaped configuration, the configurations being symmetrically disposed as illustrated in FIG. 1. The portion of each of the cables located between their end attachment points and the corresponding return pulleys are parallel to the guide rails. The cable portions supported on the corresponding return pulleys are located on the exterior tangent with respect to their attachment points so that after the cables are placed under tension on the return pulleys by means of tension elements, when one of the carriages moves in one direction it will tension one of the two cables and impose an identical and simultaneous displacement on the other carriage, both with respect to direction and distance, the carriage being maintained in alignment by virtue of the second cable.

BRIEF DESCRIPTION OF THE DRAWINGS

Other characteristics and advantages of the present invention will become clear from the description which follows, made with respect to the annexed drawings, which are given by way of non-limiting example, and wherein.

DETAILED DESCRIPTION OF THE DRAWINGS

Figure 1:
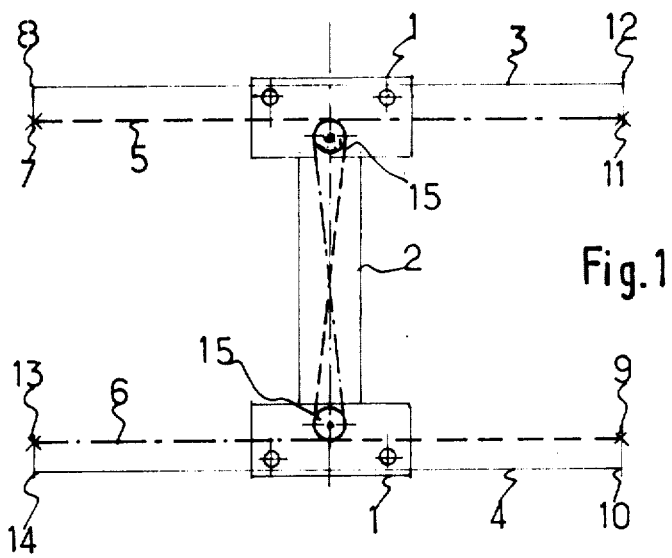
FIG. 1 is a schematic view of the apparatus.
Figure 2:
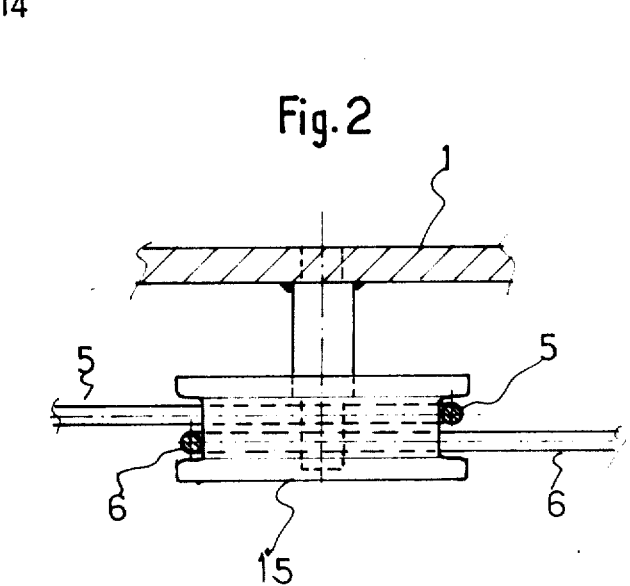
FIG. 2 is a detailed view of a return pulley illustrating the support of the cables.

As shown in FIGS. 1 and 2, an interconnection device is provided which comprises two carriages 1 connected by a central, rigid beam 2, and guided by and along parallel rails 3 and 4 which are positioned between the carriages. The apparatus comprises two symmetrical cables 5 and 6, a first end 7 of cable 5 being attached to first end 8 of rail 3, second end 9 of cable 5 being attached to second end 10 of rail 4, diagonally opposed to end 8. Similarly, second end 11 of cable 6 is attached to second end 12 of rail 3, and first end 13 of cable 6 is attached to first end 14 of rail 4. Intermediate portions of the cables between the ends 7 and 9, 11 and 13 of the cables 5 and 6, respectively, connect carriages 1 by resting upon identical return pulleys 15, positioned symmetrically on the carriages such that cables 5 and 6 each describes a Z-shaped configuration, the configurations being symmetrically disposed as best seen in FIG. 1. The portions of the cables between their attachment ends 7, 9, 11 and 13, respectively, and return pulleys 15 upon which they rest, are located parallel to the corresponding guide rails 3 and 4, respectively. Cables 5 and 6 are supported on return pulleys 15 along the exterior tangent of the pulleys with respect to the attachment of the cables 5 and 6 onto rails 3 and 4, respectively, in such a fashion that during the displacement of carriage 1 in a direction which tensions either cable 5 or 6, the cable receiving the tension imposes on the other carriage, which is not initially displaced, an identical and simultaneous displacement in direction and distance. The other cable, which is not initially displaced under tension, functions to maintain the carriages in alignment.

Adjustment of the perpendicularity of beam 2 with respect to guide rails 3 and 4 is obtained by means of a tensioning element (not shown) acting on each of the cables.

We claim:

1. Apparatus interconnecting two mobile carriages which are connected by a rigid beam guided by and along parallel guide rails, said apparatus comprising:
    (a) first and second cables interconnecting said carriages to said parallel guide rails, one end of each of said cables being attached to an end of a respective one of said guide rails and the other end of each of said cables being attached to a generally diagonally opposed end of the other, parallel guide rail;
    (b) a single return pulley fixedly associated with each of said carriages, said carriages supporting portions of said cables intermediate the ends of both of said cables, each of said cables being supported along an exterior peripheral portion of the pulleys, as viewed with respect to the attachment ends of said cables to said rails, each of said cables thereby describing a generally Z-shaped configuration between said one cable end and said other cable end, whereby the configurations of the cables are symmetric, the displacement of either one of said carriages alone placing a respective one of said cables under tension, thereby imposing an identical and simultaneous displacement, with respect both to direction and distance, upon said other carriage, said carriages being generally maintained in alignment by the other, non-tensioned cable.

2. Apparatus in accordance with claim 1 wherein the Z-shaped configuration of each of said cables comprises a first cable portion located between a first end of said cable and one of said pulleys, said first cable portion being generally parallel to one of said rails, a second, intermediate cable portion which is positioned along the periphery of a pulley on one rail, extends between said two pulleys and is positioned about the periphery of a pulley on the other rail, and a third portion which extends from said pulley on the other towards an oppositely disposed end of said other rail and is generally parallel to said other rail.

* * * * *